United States Patent [19]

Tatsumi

[11] Patent Number: 5,045,933
[45] Date of Patent: Sep. 3, 1991

[54] METHOD AND APPARATUS FOR COLOR CORRECTING DIGITIZED IMAGES

[75] Inventor: Setsuji Tatsumi, Kanagawa, Japan

[73] Assignee: Fuji Photo Film Co., Ltd., Kanagawa, Japan

[21] Appl. No.: 395,632

[22] Filed: Aug. 18, 1989

[30] Foreign Application Priority Data

| Aug. 22, 1988 | [JP] | Japan | 63-206249 |
| Aug. 22, 1988 | [JP] | Japan | 63-206250 |
| Aug. 22, 1988 | [JP] | Japan | 63-206251 |
| Feb. 13, 1989 | [JP] | Japan | 1-31195 |

[51] Int. Cl.⁵ .......................... H04N 1/46; G03F 3/08
[52] U.S. Cl. ........................................ 358/80; 358/78
[58] Field of Search ................... 358/75, 80, 13, 78

[56] References Cited

U.S. PATENT DOCUMENTS

| 4,634,844 | 1/1987 | Sasaki | 358/80 |
| 4,814,867 | 3/1989 | Tsuda et al. | 358/80 |
| 4,974,070 | 11/1990 | Hock et al. | 358/78 |

Primary Examiner—Howard W. Britton
Assistant Examiner—Kim Yen Vu
Attorney, Agent, or Firm—Sughrue, Mion, Zinn, Macpeak & Seas

[57] ABSTRACT

An image processing method for producing color-corrected output color signals in response to respective hue-separated input color signals, such as from the output of a scanner, having a reduced memory requirement for transformation coefficients yet with little sacrifice in transformation accuracy. In a preferred embodiment, transformation coefficients for each of three output color signals are produced having individual bit lengths determined in accordance with a degree of correlation with the respective input color signal. The input color signals are subjected to transformation operations using the stored coefficients.

4 Claims, 4 Drawing Sheets

5,045,933

METHOD AND APPARATUS FOR COLOR CORRECTING DIGITIZED IMAGES

BACKGROUND OF THE INVENTION

The present invention relates to an image processing method and apparatus for reproducing a color image according to hue-based color signals which are obtained by converting optical image information into electric signals. More particularly, the invention relates to an image processing method and apparatus for correcting color mismatching between an imaged object and the reproduced image by means of color matching.

A conventional image processing method will be explained with reference to the example of a copying machine. In such an apparatus, a color image is reproduced on a sensitized material by scanning an original document to be copied with a color image sensor to produce color signals on a hue basis, the resulting signals are digitized, and then light-generating elements such as LEDs are driven by the color signals and a sensitized recording material is scanned with the resulting light signals to record an image thereon.

However, since the spectral absorption characteristics of the original being copied and the recording materials generally do not correspond one-to-one, it is necessary to correct the color signals using a color matching technique before the image is reproduced.

Conventional image processors employing color matching have a construction as shown in FIG. 1. Circuits 1, 2, 3 in FIG. 1 are logarithmic conversion circuits, which, for example, in a copying machine are provided for respective color signals R, G, B produced by scanning the document to be copied with an image sensor and converting the resulting signals into digital values via an A/D converter. The circuits 1, 2, 3 produce respective logarithmic values C, M, Y corresponding to the respective color signals R, G, B as complementary color signals. This logarithmic process is employed partly because of the logarithmic characteristic of human vision. In order to minimize the size of the correction circuits, they are implemented in so-called "firmware" by pre-storing outputs corresponding to inputs in a read-only-memory (ROM).

Circuits 4, 5, 6 are color correction circuits, which perform correcting operations upon the respective color signals in such a manner that the hues of the reproduced image are made to accurately correspond with those of the document being copied. This correcting operation is performed in accordance with the operations indicated by the following equation (1). That is, as indicated by equation (1), cyan-related data C, magenta-related data M, and yellow-related data Y are added after being multiplied by predetermined conversion coefficients $a_{11}$ to $a_{33}$.

$$C' = a_{11} \cdot C + a_{12} \cdot M + a_{13} \cdot Y$$
$$M' = a_{21} \cdot C + a_{22} \cdot M + a_{23} \cdot Y \quad (1)$$
$$Y' = a_{31} \cdot C + a_{32} \cdot M + a_{33} \cdot Y$$

Expressing the above equation in the form of a matrix operation, $$\begin{bmatrix} C' \\ M' \\ Y' \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} C \\ M \\ Y \end{bmatrix} \quad (2)$$

The conversion coefficients $a_{11}$ to $a_{33}$ are derived empirically and pre-stored in ROMs. During actual correction operations, the above operations indicated by equation (1) are performed by reading the conversion coefficients using, for example, a microprocessor.

Circuits 7, 8 and 9 are output adjusting circuits which make fine adjustments for the level of the corrected color signals C', M', Y' produced by the respective color correction circuits 4, 5, 6 before the signals are applied to LEDs to expose the recording material to light based on the finely adjusted color signals $C_O$, $M_O$, $Y_O$.

The above technique is applicable not only to copying machines but also to correcting color mismatch between a hard copy and its image displayed on a television monitor.

However, in the conventional picture processing method, a common data length is employed for all the data of transformation coefficients stored in ROM, and hence usually a large storage capacity and large size of operating circuit are necessary.

In the case of linear matrix transformation, the storage capacity and the size of the required operating circuit are not too serious problems owing to the relatively small number of data values required for the transformation coefficient. However, the matrix operation described above with respect to equations (1) and (2) applies only to the case of linear correction where the conversion coefficients $a_{11}$ to $a_{33}$ are constant. On the other hand, for nonlinear matrix transformation and direct color matching in which the output signal must be made to accurately correspond with the input color signal, the required ROM storage capacity and the size of the operating circuit become tremendously large because the matrix of transformation coefficients is complex and data values for many conditions are needed.

SUMMARY OF THE INVENTION

The present invention was made to solve the problems discussed above.

Accordingly, it is an object of the invention to provide an image processing method and apparatus wherein the storage capacity required for the transformation coefficients is reduced.

In accordance with this object, the invention provides an image processing method and apparatus wherein an original document is scanned to produce input color signals in three primary colors or complementary primary colors, transformation coefficients are stored wherein the bit length of the transformation coefficients for the most strongly correlated input color signal is made longer than the bit length of the transformation coefficients for the most weakly correlated input color signal, and the input color signals are subjected to transformation operations using the stored coefficients.

By establishing the bit length of the transformation coefficients in accordance with the degree of correlation of the respective colors, the required storage capacity for the transformation coefficients is significantly reduced.

Further in accordance with this object, the invention provides an image processing method wherein an original document is scanned to produce input color signals in three primary colors or complementary primary colors, a plurality of variable input data are generated in response to the input color signals, transformation coefficients are stored wherein the bit length of the transformation coefficients for the most strongly correlated input color signal is made longer than the bit length of the transformation coefficients for the most weakly correlated input color signal, the input color signals are subjected to transformation operations using the stored coefficients, correction coefficients are obtained by an averaging operation so as to reduce the amount of error contained in the color or complementary color signals thereby produced, and final color output signals are obtained by carrying out convolution operations with the correction coefficients and the variable data.

As in the case above, by establishing the bit length of the transformation coefficients in accordance with the degree of correlation of the respective colors, the required storage capacity for the transformation coefficients is significantly reduced, while the amount of error contained in the final color output signals due to the truncation of the transformation coefficients is significantly reduced with the averaging operation.

Further in accordance with the above and other objects, the invention provide an image processing method wherein, for each output color signal, three variable data are generated. Each variable datum is produced by operating upon three input color signals, with the number of bits of each of the input color signals used to generate each variable datum being determined in accordance with the degree of correlation of the variable datum with the three input color signals from which it is generated. The three variable data for each output color are summed together to produce each of the respective color output signals.

Furthermore in accordance with the above and other objects, the invention provides an image processing apparatus comprising means for scanning an original to produce input color signals in three primary colors or complementary primary colors; means of generating a plurality of variable data to be used for producing a respective color-corrected output signal, for each of said input, color signals said variable data for each of said input color signals being produced by addressing a memory with each of said input color signals with a bit length determined in accordance with a degree of correlation with the respective input color signal to be corrected; means for producing a plurality of correction coefficients by an averaging operation on said variable data for each of said input color signals so as to reduce the amount of error contained in color signals produced as a result of said transformation operations; and means for producing final color output signals by carrying out convolution operations with said correction coefficients and said variable data.

Similar to the above embodiments, by using less than the full number of available bits of each of the input color signals in generating each variable datum, the size of the respective circuits and the memory capacity required is very significantly reduced.

DESCRIPTION OF THE PREFERRED EMBODIMENTS

Figure 1:
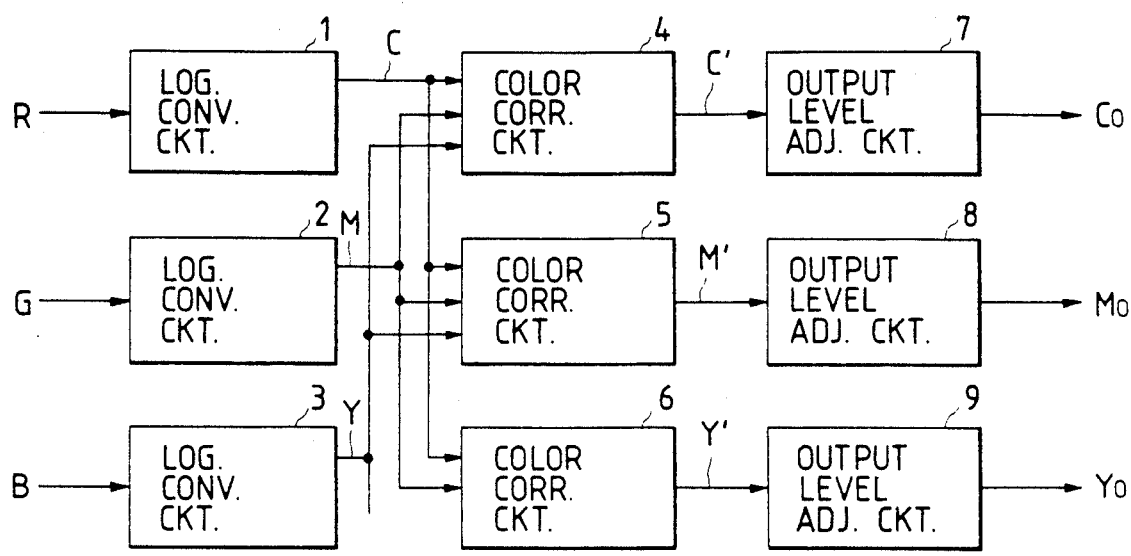
FIG. 1 is a block diagram of a conventional color image processor.
Figure 2:
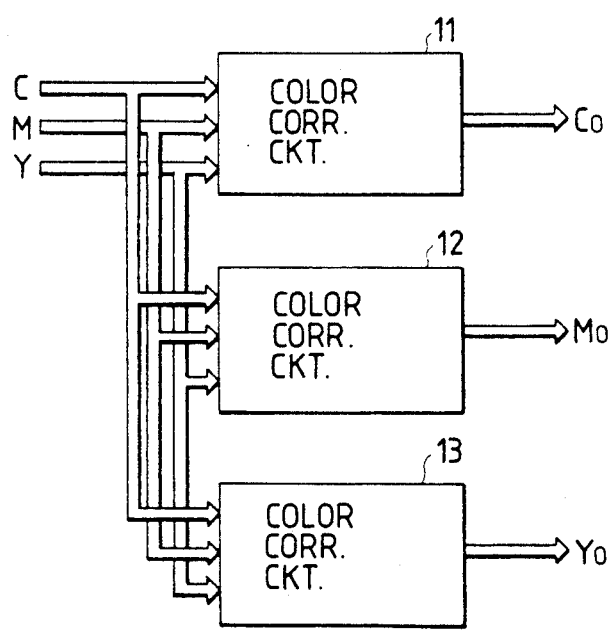
FIG. 2 is a block diagram of a color image processor operating in accordance with a first preferred embodiment of the invention.

A first example of an image processing method of the invention will be explained with reference to FIG. 2 of the drawings. FIG. 2 shows the construction of an operating circuit for carrying out multiple color-matching operations in accordance with this embodiment of the invention.

Reference numerals 1, 2, 3 in the figure indicate color correction circuits. In color correction circuit 1, using equation (1) above, the following operation is carried out:

$$C_O = a_{11} \cdot C + a_{12} \cdot M + a_{13} \cdot Y,$$

in color correction circuit 2, the following operation is carried out:

$$M_O = a_{21} \cdot C + a_{22} \cdot M + a_{23} \cdot Y,$$

and in color correction circuit 3, the following operation is carried out:

$$Y_O = a_{31} \cdot C + a_{32} \cdot M + a_{33} \cdot Y$$

New color signals $C_O$, $M_O$ and $Y_O$ are thereby generated to reproduce the input image by carrying out multiple operations using the specified transformation coefficients for the color signals of cyan (C), magenta (M) and yellow (Y) derived from scanning the original document or other input image.

For example, a halogen lamp may be used to illuminate the original document or the like. If the reproduced picture is to be formed on silver salt film, the values of the transformation coefficients for operating upon the cyan signal ($C_O$) are $a_{11} = 1.5$, $a_{12} = -0.4$ and $a_{13} = -0.1$, respectively. Thus, the most strongly correlated input signal for the operation upon the cyan input signal ($C_O$) is cyan itself, and accordingly the coefficient $a_{11}$ is given to eight bits. Magenta (M) is less strongly correlated, and hence the corresponding coefficient is allotted seven bits. Yellow (Y) is the most weakly correlated, and the respective coefficient is given to only five bits. Memory allocations and transformation operations are carried out using the specified number of bits for each case.

In the color correction circuit 2 for outputting the new value of magenta $M_O$, similar to the case of cyan, the detected signal of magenta (M) is the most strongly correlated to $M_O$, and thus the transformation coefficient $a_{22}$ is given to eight bits, while the transformation coefficients for residual cyan (C) and yellow (Y) are given to six bits. Furthermore, in the color correction circuit 3 for outputting the new value of $Y_O$, as above, the detected signal of yellow (Y) is the most strongly correlated to $Y_O$, and thus the transformation coefficient $a_{33}$ is given to eight bits, the transformation coefficient $a_{31}$ for residual cyan (C) to five bits, and the transformation coefficient $a_{32}$ for magenta (M) to seven bits.

As explained above, the storage capacity can be reduced by 50% by setting the bit-length of the transformation coefficients in accordance with the degree of correlation to the new color signal to be generated. In so doing, the amount of degradation of the transformation accuracy is held to a minimum level because truncation occurs only for the weakly correlated transformation coefficients.

The example above relates to linear matrix transformation, but the invention is also applicable for nonlinear matrix transformation and direct color matching.

With the embodiment of the invention described above, the required storage capacity can be tremendously reduced compared with that of the conventional approach.

In the above example, an explanation has been given with respect to complementary color signals, but the invention can of course be applied for primary color signals.

As explained above, in the picture processing method of the invention in which output color signals in three colors are generated by performing multiply-and-add matrix operations using transformation coefficients of predetermined values upon input color signals produced by scanning an original document or other image to be reproduced, the transformation coefficient for the color signal most strongly correlated with the composite output color signal is supplied to the greatest number of bits, while the transformation coefficients for the less strongly correlated color signals are supplied to a lesser number of bits. Accordingly, the total required storage capacity for the transformation coefficients is very significantly reduced, while the amount of color degradation is kept to a minimum.

Figure 3:
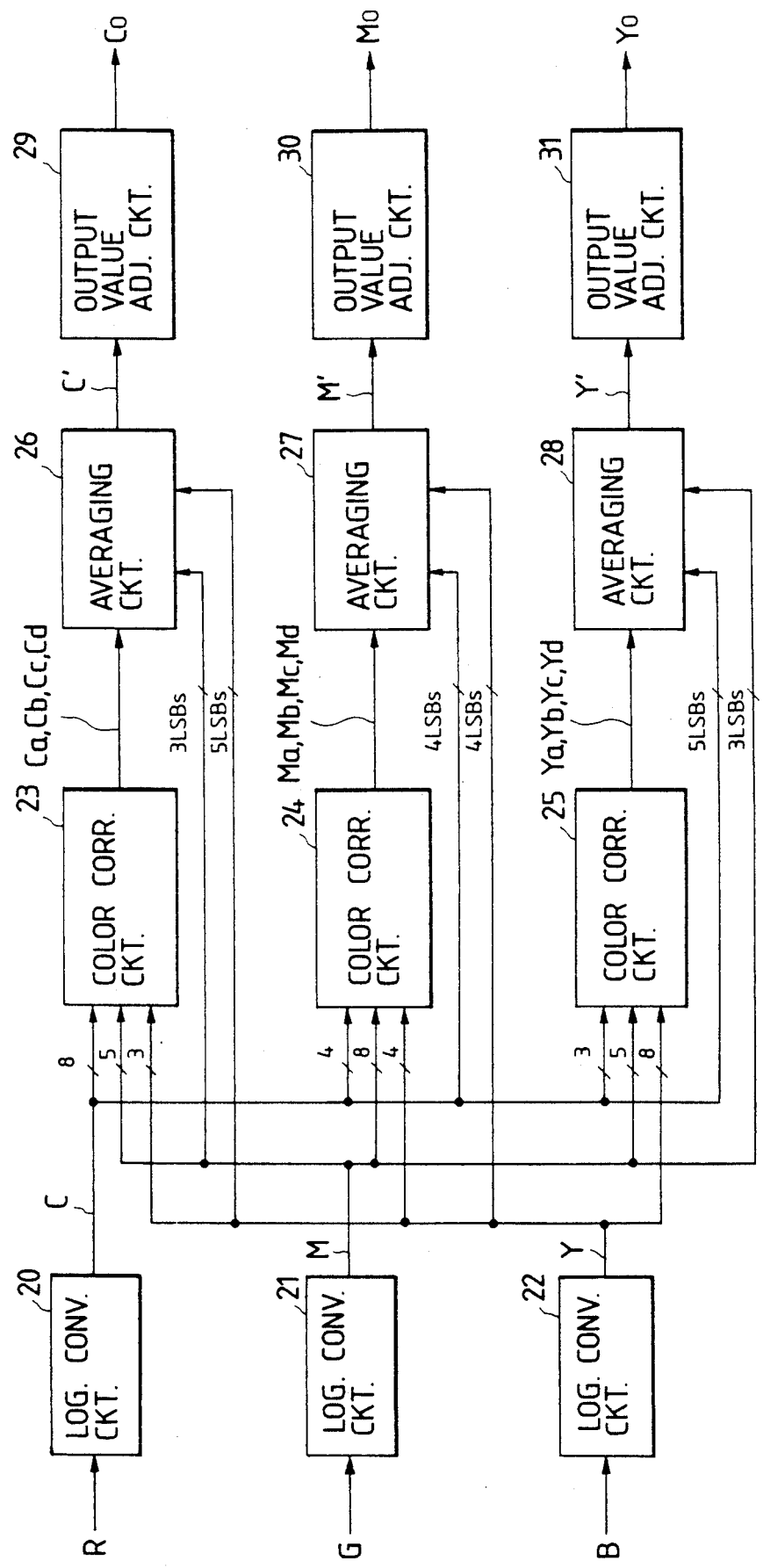
FIG. 3 is a block diagram of a color image processor operating in accordance with a second embodiment of the invention.

A second embodiment of the invention will be described with reference to FIGS. 3 and 4 of the drawings.

The color image processor of the second embodiment employs logarithmic converter circuits 20, 21, 22 similar to the like-named elements in the above-described first embodiment. The logarithmic converter circuits 20, 21, 22 receive respective red (R), green (G) and blue (B) signals from an input scanner and produce therefrom by logarithmic conversion cyan (C), magenta (M) and yellow (Y) signals representative of the input image. The outputs of the logarithmic converter circuits 20, 21, 22 are applied to color correction circuits 23, 24, 25 in a manner similar to that of the first embodiment. That is, as an example, the outputs of each of the logarithmic converter circuits 20, 21, 22 are eight bits wide. The first color correction circuit 23 receives all eight bits of the cyan signal C, the five MSBs (most significant bits) of the magenta signal M, and the three MSBs of the yellow signal Y. Similarly, the second color correction circuit 24 receives all eight bits of the magenta signal M, the four MSBs of the cyan signal C, and the four MSBs of the yellow signal Y, while the third color correction circuit 25 receives all eight bits of the yellow signal Y, the three MSBs of the cyan signal C, and the five MSBs of the magenta signal M.

The first color correction circuit 23 produces four variable data Ca, Cb, Cc, Cd corresponding to the color signals C, M, Y supplied thereto. The latter signals are applied as address signals in a table look-up operation. Similarly, the second color correction circuit 24 produces variable data values Ma, Mb, Mc, Md and the third color correction circuit 25 produces variable data values Ya, Yb, Yc, Yd in response to the respective addressing signals derived from the indicated number of bits of C, M, Y.

Averaging circuits 26, 27 and 28 receive the above-described variable data value outputs from respective ones of the color correction circuits. Also, the averaging circuits receive as inputs the unused LSBs (least significant bits) from the addressing signals applied to their corresponding color correction circuits. That is, the first averaging circuit 26 receives, in addition to the variable data values Ca, Cb, Cc, Cd, the three LSBs of the magenta signal M and the five LSBs of the yellow signal Y, the second averaging circuit 27 receives, in addition to the variable data values Ma, Mb, Mc, Md, the four LSBs of the cyan signal C and the four LSBs of the yellow signal Y, and the third averaging circuit 28 receives, in addition to the variable data values Ya, Yb, Yc, Yd, the five LSBs of the cyan signal C and the three LSBs of the magenta signal M. From this information, the averaging circuits 26, 27, 28 produce respective intermediate color signals C', M', Y'. The intermediate color signals C', M', Y' are inputted to corresponding output value adjusting circuits 29, 30, 31 which perform fine adjustments and generate current signals $C_O$, $M_O$, $Y_O$ for driving respective LEDs in an output scanner (not shown).

In accordance with this embodiment of the invention, approximation operations are carried out to minimize the effects of the truncation errors in the C, M, Y signals caused by using less than the full eight bits of each in driving the three color correction circuits.

The operating principles of the image processor so constructed will now be discussed. Since the respective circuits generating signals for cyan, magenta and yellow perform operations based on the same principle, the first color correction circuit 23 and the first averaging operation circuit 26 will be representatively explained.

The first color correction circuit 23 produces the variable data Ca, Cb, Cc, Cd, each of which corresponds to the color signals C, M, Y supplied as address signals in a predetermined number of bits. It is assumed that the cyan color signal C is 100 (C=100), the magenta color signal M is 50 (M=50), and the yellow color signal Y is 20 (Y=20) in some arbitrary units. The variable data values Ca, Cb, Cc, Cd will be read out from an address area specified by the reduced numbers of bits of which these signals consist.

The averaging operation circuit 26 produces a cyan color signal C' from the variable data values Ca, Cb, Cc, Cd. Here, since there is a full eight-bit data input for the cyan color signal C, there is no need to consider errors for the actual color as far as cyan is concerned. However, the circuit 26 simultaneously performs approximation operations to minimize errors of the variable data Ca, Cb, Cc, Cd for the three LSBs of the magenta color signal M whose five MSBs are supplied as inputs to the first color correction circuit 23, and for the five LSBs of the yellow color signal Y whose three MSBs are supplied as inputs. Specifically, for the example at hand, the averaging operation circuit 26 generates within itself two values 48 and 56 which are close to M=50 and specify the maximum error occurring in the three LSBs of the magenta color signal M as 8, and two values 0 and 32 which are close to Y=20 and specify the maximum error occurring in the five LSBs of the yellow color signal Y as 32.

Figure 4:
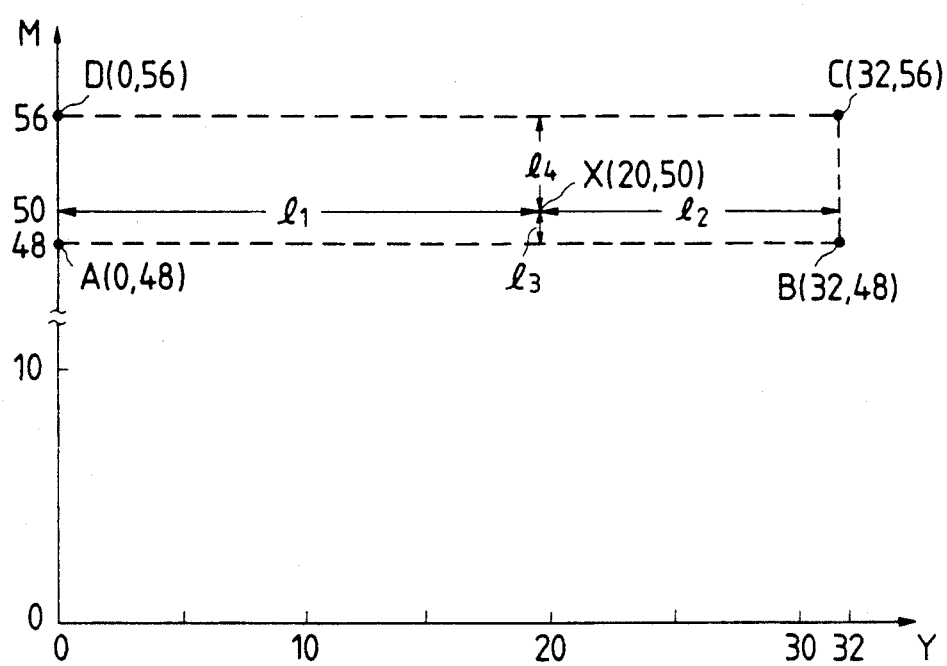
FIG. 4 is an explanatory diagram used for explaining the principles of an approximation operation performed by color correction circuits and averaging circuits employed in the color image processor of FIG. 3.

FIG. 4 plots four points A, B, C, D obtained by a combination of the four values thus generated. In this diagram, the vertical axis indicates magenta and the horizontal axis yellow. The actual values indicated by the full eight-bit yellow and magenta signals must fall within an area surrounded by the four points, A (0,48), B (32,48), C (0,56), D (32,56). Values close to such actual points are obtained by approximation from the above four points.

More specifically, the approximation operation is performed in the following manner. First, respective coordinate distances $M_1$, $M_2$, $M_3$, $M_4$ between the point X (20,50) in FIG. 4 and the four points A, B, C, D are obtained, and then coordinate distance ratios are obtained. In other words, the distance $M_1$ between points X and A (or D) along the horizontal axis is equal to 20 ($M_1 = 20-0$), the distance $M_2$ between points X and B (or C) along the horizontal axis is equal to 12 ($M_2 = 32-20$), the distance $M_3$ between points X and A (or D) along the vertical axis is equal to 2 ($M_3 = 50-48$), and the distance $M_4$ between points X and B (or C) along the vertical axis is equal to 6 ($M_4 = 56-50$). Thus, $M_1:M_2 = 20:12$, $M_3:M_4 = 2:6$. Finally variable values $M_1 = 20$, $M_2 = 12$, $M_3 = 8$ and $M_4 = 24$ are obtained by relatively matching the ratios. Correction coefficients $k_1$, $k_2$, $k_3$, $k_4$, each of which indicates a distance between each of four points and the relative approximate value, are calculated from the following equation (3) using the above variables.

$$\left. \begin{array}{l} k_1 = M_2 + M_4 = 12 + 24 = 36 \\ k_2 = M_1 + M_4 = 20 + 24 = 44 \\ k_3 = M_1 + M_3 = 20 + 8 = 28 \\ k_4 = M_2 + M_3 = 12 + 8 = 20 \end{array} \right\} \quad (3)$$

Then, as indicated by the following equation (4), the intermediate cyan color signal C' is calculated by multiplying the correction coefficients $k_1$, $k_2$, $k_3$, $k_4$, by the variable data Ca, Cb, Cc, Cd, and further averaging the sum of products obtained from such multiplication by a sum $Sk_i$ of the correction coefficients $k_1$, $k_2$, $k_3$, $k_4$.

$$C = \frac{1}{Sk_i} (k_1 \cdot Ca + k_2 \cdot Cb + k_3 \cdot Cc + k_4 \cdot Cd) \quad (4)$$

Color matching is likewise performed for the color signals of other colors by carrying out the same operations as indicated by the above equations (3) and (4).

As discussed above, since the variable data lengths for performing color matching have been shortened to reduce the required storage capacity, and further since errors which occur due to the data code lengths having been shortened are corrected by approximation operations, accuracy in color matching can be maintained.

If desired, the multiplications of the coefficients $k_1$, $k_2$, $k_3$, $k_4$ by the variable data Ca, Cb, Cc, Cd, as indicated by the above equation (4), may be replaced by operations virtually equivalent thereto such as by performing addition operations while repetitively reading the respective variable data Ca, Cb, Cc, Cd for each of the coefficients $k_1$, $k_2$, $k_3$, $k_4$ from the color correction circuits 13, 14, 15.

As explained above, according to the present invention wherein bit lengths of the variable data used in color matching for hue correction have been shortened, the storage capacity for storing these variable data can be reduced, thereby promoting miniaturization of the processor. Further, since errors which arise due to the data code lengths having been shortened are corrected by approximation operations, the accuracy of color matching is maintained.

In accordance with yet another embodiment of the invention, for each of the corrected color signals, three types of predetermined variables are generated via nonlinear conversion, with the variables differing from one another in the degree of correspondence to the hues of the input color signals or complementary color signals, and the variable data is summed to produce the final color output signals. With this arrangement, accurately approximated corrected color signals are obtained in which errors due to mismatching arising in the nonlinear generation of the variable are substantially eliminated.

Referring now to the arrangement shown in FIG. 5, another embodiment of the present invention will be described.

Figure 5:
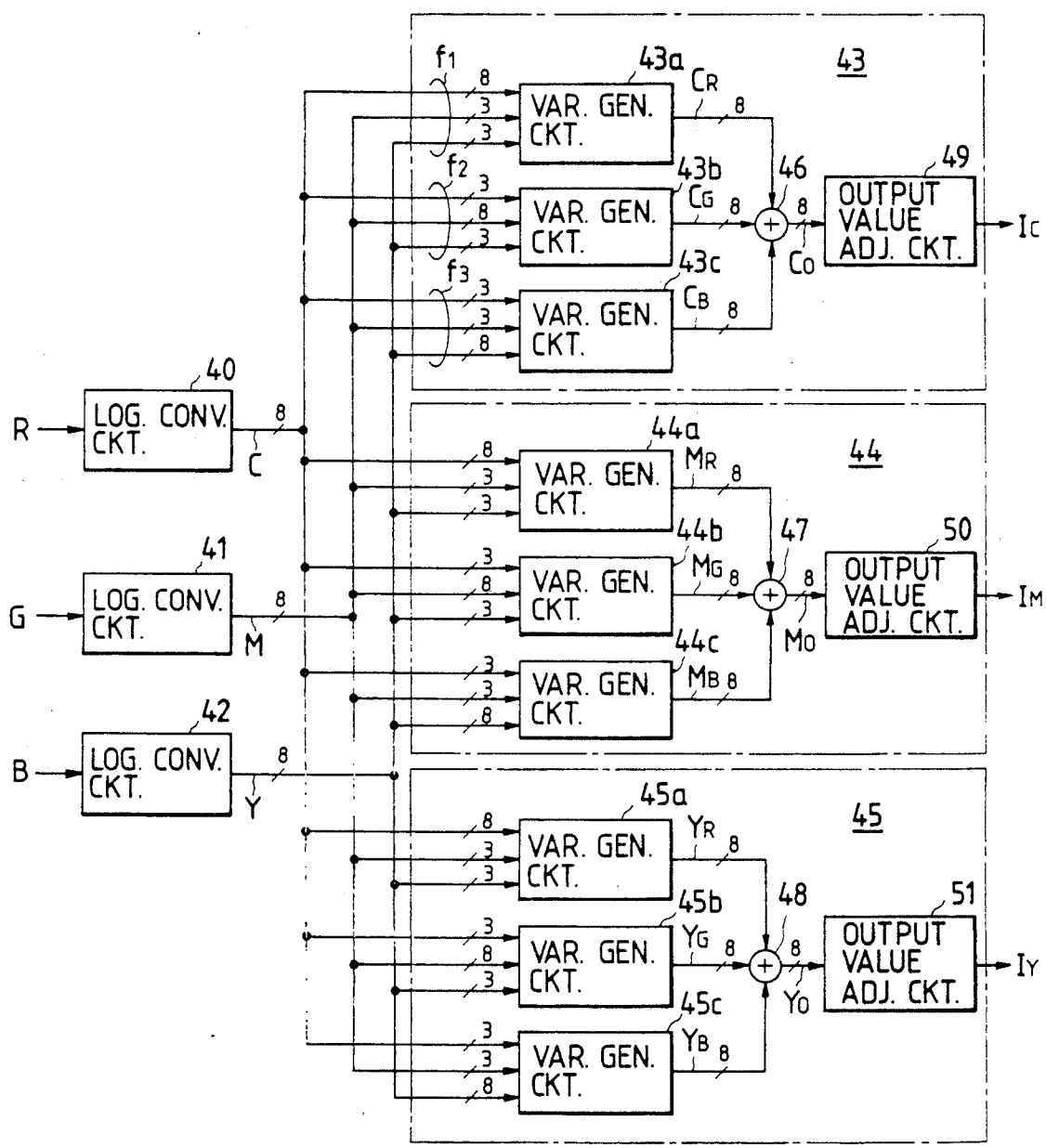
FIG. 5 is a block diagram showing an image processor constructed in accordance with a third embodiment of the invention.

In FIG. 5, circuits 40, 41, 42 are logarithmic conversion circuits, which output eight-bit complementary color signals for cyan (C), magenta (M), and yellow (Y) by performing logarithmic operations on primary color signals, namely, the red signal (R), green signal (G), and blue signal (B) obtained by scanning the original document, etc., to be copied.

These color signals C, M, Y are supplied to a first circuit 43 which generates corrected color signals for cyan (C), to a second circuit 44 which generates corrected color signals for magenta (M), and to a third circuit 45 which generates corrected color signals for yellow (Y).

The first circuit 43 includes three variable generating circuits 43a, 43b, 43c, the second circuit 44 includes three variable generating circuits 44a, 44b, 44c, and the third circuit 45 is composed of three variable generating circuits 45a, 45b, 45c. Each of the variable generating circuits is implemented either as a read-only memory (ROM) or a random access memory (RAM) which outputs variable data corresponding to the color signals C, M, Y in response to the address signals supplied on their respective inputs.

Circuits 46, 47, 48 are adders, each of which performs adding operations on the variable data from the respective variable generating circuits 43, 44, 45 and supplies the results as the corrected color signals $C_O$, $M_O$, $Y_O$.

Circuit 49, 50, 51 are output value adjusting circuits which perform fine adjustments on the corrected color signals $C_O$, $M_O$, $Y_O$ from the respective adders 46, 47, 48 and convert such signals into electric currents $I_C$, $I_M$, $I_Y$, which are fed to light-emitting elements which cause the image to be reproduced by exposing a sensitized recording material, etc.

In more detail, since each of the first, second, third circuits 43, 44, 45 have the same construction, only the first circuit 43, which generates the corrected color signal $C_O$ for cyan, will be representatively explained.

The variable generating circuit 43a simultaneously receives inputs consisting of a full eight bits of the cyan color signal C, the three MSBs of the eight-bit magenta color signal M, and the three MSBs of the eight-bit yellow color signal Y, and from this information produces a 14-bit data value $f_1$ as an address signal. Likewise, the variable generating circuit 43b receives inputs of the three MSBs of the cyan color signal C, the full eight bits of the magenta color signal M, and the three MSBs of the yellow color signal Y, while the variable generating circuit 43c receives inputs of the three MSBs of the cyan color signal C, the three MSBs of the magenta color signal M, and the full eight bits of the yellow color signal Y, forming therefrom address signals, each consisting of a total of 14 bits. The first variable generating circuit 43a therefrom produces variable data $C_C$ corresponding to the address signal $f_1$. In other words, one specific variable data value which corresponds to the value of the address signal $f_1$ from among a combination of $2^{14}$ of variable data values is produced, whereby the variable generating circuit 43a forms variable data for cyan which is closely correlated with the cyan color signal. The second variable generating circuit 43b produces variable data $C_M$ corresponding to the address signal $f_2$. In other words, one specific variable data value which corresponds to the value of the address signal $f_2$ from among a combination of $2^{14}$ of variable data values is produced, whereby the variable generating circuit 43b forms variable data for correction from an input magenta color signal which serves to form the cyan color signal. The third variable generating circuit 43c produces variable data $C_Y$ corresponding to the address signal $f_3$. In other words, one specific variable data value which corresponds to the value of the address signal $f_3$ from among a combination of $2^{14}$ of variable data values is produced, whereby the variable generating circuit 43c produces variable data for correction by an input yellow color signal which serves to form the cyan color signal. These variable data $C_C$, $C_M$, $C_Y$ are added by the adder 46 to yield a corrected cyan color signal $C_O$.

Figure 6:
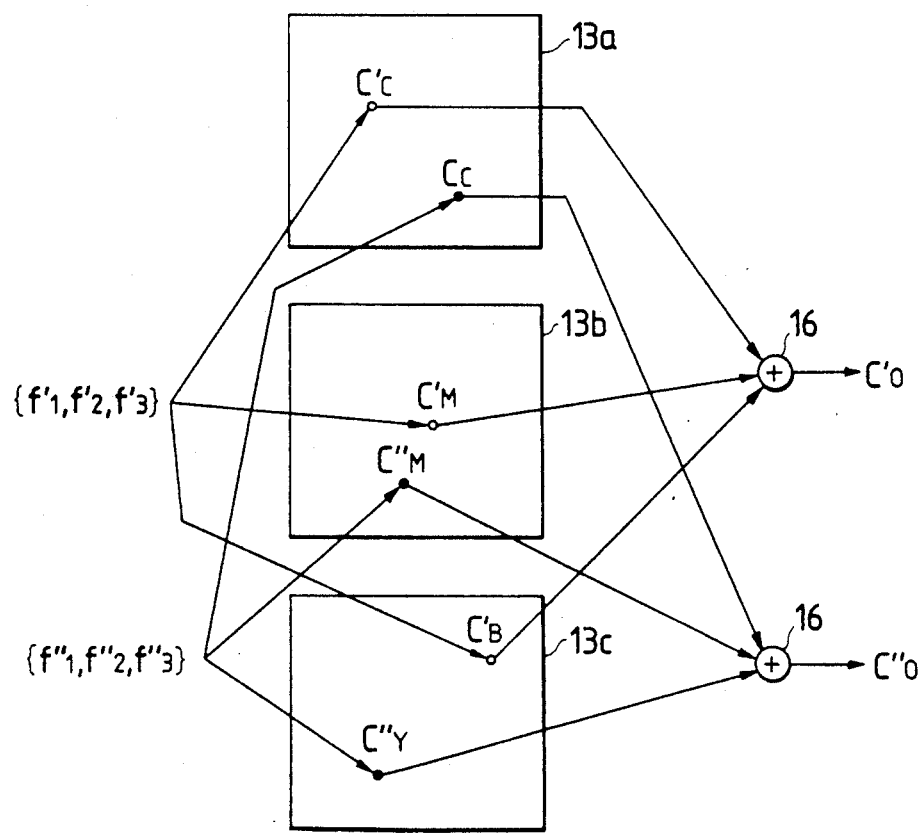
FIG. 6 is an explanatory diagram for explaining the principles of operation of the image processor of FIG. 5.

FIG. 6 is an explanatory drawing illustrating the above operating principle in more detail. When address signals $\{f_1', f_2', f_3'\}$ are generated in correspondence to the separated color signals C, M, Y from an image sensor, etc., corresponding variable data $C_C'$, $C_M'$, $C_Y'$ will be produced by the variable generating circuits 43a, 43b, 43c. The variable data $C_C'$, $C_M'$, $C_Y'$ are specific to the output address signals $\{f_1', f_2', f_3'\}$. That is, since the data are empirically obtained based on the spectral absorption characteristics of the material to be copied and that of the sensitized material on which the reproduced image is to be recorded, data matching the nonlinearity of such spectral absorption characteristics is provided. By adding the variable data $C_C'$, $C_M'$, $C_Y'$, a finally corrected color signal $C_O'$ for cyan is generated. Similarly, upon generation of address signals $\{f_1'', f_2'', f_3''\}$ in response to inputs of the primary color signals of other tones, another set of specific variable data $C_C''$, $C_M''$, $C_Y''$ will likewise be generated to produce another corrected color signal $C_O''$ for cyan.

The above principle can be expressed mathematically using a functional operator F for an output variable datum C corresponding to the input data $\{f_1, f_2, f_3\}$ of the first variable generating circuit as:

$$C_C = F_{CC}\{f_1, f_2, f_3\}$$

Likewise, expressing other variable data as:

$$C_M = F_{CM}\{f_1, f_2, f_3\}$$

$$C_Y = F_{CY}\{f_1, f_2, f_3\}$$

the corrected color signal $C_O$ is:

$$C_0 = F_{CC}\{f_1, f_2, f_3\} + F_{CM}\{f_1, f_2, f_3\} + F_{CY}\{f_1, f_2, f_3\} \quad (5)$$

As is clear from the above equation (5), this operation amounts to detecting the nonlinear variable data corresponding to $\{f_1, f_2, f_3\}$ and performing a linear operation by further adding these variable data.

As regards the other circuits 44, 45 for generating the corrected color signals $M_O$ for magenta and $Y_O$ for yellow, the variable data $M_C$, $M_M$, $M_Y$ for the variable generating circuits 44a to 44c is expressed as:

$$M_C = F_{MC}\{f_1, f_2, f_3\}$$

$$M_M = F_{MM}\{f_1, f_2, f_3\}$$

$$M_Y = F_{MY}\{f_1, f_2, f_3\}$$

and the variable data $Y_C$, $Y_M$, $Y_Y$ for the variable generating circuits 45a to 45c is expressed as:

$$Y_C = F_{YC}\{f_1, f_2, f_3\}$$

$$Y_M = F_{YM}\{f_1, f_2, f_3\}$$

$$Y_Y = F_{YY}\{f_1, f_2, f_3\}$$

Therefore, $$M_0 = F_{MC}\{f_1, f_2, f_3\} + F_{MM}\{f_1, f_2, f_3\} + F_{MY}\{f_1, f_2, f_3\} \quad (6)$$
$$Y_0 = F_{YC}\{f_1, f_2, f_3\} + F_{YM}\{f_1, f_2, f_3\} + F_{YY}\{f_1, f_2, f_3\} \quad (7)$$

As illustrated by the above embodiment, unlike the conventional correction of color mismatch by simple linear matrix operations, by generating in advance variable data indicating the nonlinear characteristics and subjecting such values to adding operations, any error between the corrected color signals and the input color signals is effectively minimized.

Further, as shown by slanted lines and numerals (3 or 8) indicated on the data transfer lines in FIG. 5, the number of bits is increased for input data of a color signal which is more strongly correlated to each of the corrected color signals and the number of bits is decreased for input data of a color signal which is weakly correlated. As a result, the storage capacity of the ROM used in each variable generating circuit is reduced compared to the case where a color signal consisting of the maximum number of bits (eight bits in this embodiment) is used for the address signals. Moreover, since the number of bits of input data of each color signal is determined in accordance with the degree of its correlation to the respective corrected color signal, the reduction in the number of bits of variable data employed does not greatly affect the approximation accuracy.

What is claimed is:

1. An image processing method, comprising the steps of: scanning an original to produce input color signals in three primary colors or complementary primary colors; for each of said input color signals, generating a plurality of variable data to be used for producing a respective color-corrected output signal, said variable data for each of said input color signals being produced by addressing a memory with each of said input color signals with a bit length determined in accordance with a degree of correlation with the respective input color signal to be corrected; producing a plurality of correction coefficients by an averaging operation on said variable data for each of said input color signals so as to reduce the amount of error contained in color signals produced as a result of said transformation operations; and producing final color output signals by carrying out convolution operations with said correction coefficients and said variable data.

2. The image processing method of claim 1, wherein each said averaging operation includes carrying out averaging including least significant bits of said input color signals not used in producing said variable data.

3. An image processing method comprising the steps of: generating three variable data for each of three input color signals, each variable datum being produced in response to each of said three input color signals with the number of bits of each of the input color signals used to generate each variable datum being determined in accordance with the degree of correlation of the variable datum with the three input color signals from which it is generated; and summing each of the three variable data for each output color to produce each of the respective color output signals.

4. An image processing apparatus, comprising means for scanning an original to produce input color signals in three primary colors or complementary primary colors; means for generating a plurality of variable data to be used for producing a respective color-corrected output signal, for each of said input color signals said variable data for each of said input color signals being produced by addressing a memory with each of said input color signals with a bit length determined in accordance with a degree of correlation with the respective input color signal to be corrected; means for producing a plurality of correction coefficients by an averaging operation on said variable data for each of said input color signals so as to reduce the amount of error contained in color signals produced as a result of said transformation operations; and means for producing final color output signals by carrying out convolution operations with said correction coefficients and said variable data.

* * * * *